Jan. 11, 1938.  J. MIHALYI ET AL  2,105,255

EXPOSURE METER

Filed Feb. 15, 1936

INVENTORS
Joseph Mihalyi & Newton B. Green
BY
ATTORNEYS

Patented Jan. 11, 1938

2,105,255

UNITED STATES PATENT OFFICE 2,105,255

EXPOSURE METER

Joseph Mihalyi and Newton B. Green, Rochester, N. Y., assignors, by mesne assignments, to Eastman Kodak Company, Jersey City, N. J., a corporation of New Jersey Application February 15, 1936, Serial No. 64,088

3 Claims. (Cl. 235—85)

This invention relates to photography, and more particularly to exposure meters by which the light conditions can be accurately measured. One object of our invention is to provide an exposure meter particularly adapted for use with motion picture cameras in which the operations necessary to calculate the exposure are reduced to a minimum. Another object of our invention is to provide an exposure meter in which the primary scales from which the exposure is determined are graduated into units which are identically the same, so as to reduce the chances of difficulty arising from having to read the exposure from a number of different scales. Still another object of our invention is to provide an exposure meter which is as far as possible made so that it can be directly read for the majority of exposures which are to be made. A still further object of our invention is to provide a simple type of relatively adjustable calculating scale construction, and other objects will appear from the following specification, the novel features being particularly pointed out in the claims at the end thereof.

Our exposure meter is of the type employing a light-sensitive cell in which the quantity of light falling on the cell determines the position of a pointer. These cells are well known.

Coming now to the drawing wherein like reference characters denote like parts throughout:

Figure 2:
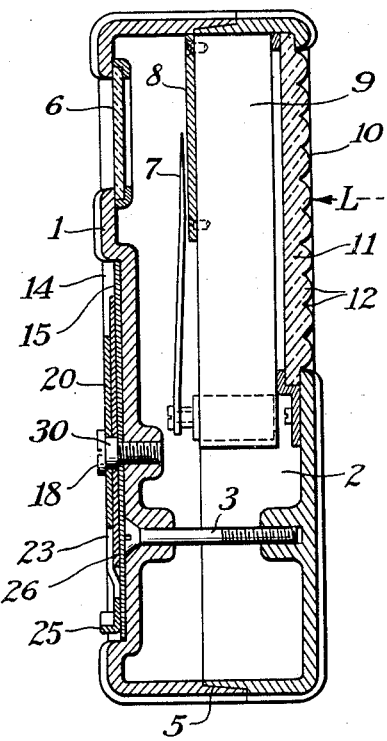
Fig. 2 is a section on line 2—2 of Fig. 1, parts being shown in elevation.

In accordance with a preferred embodiment of our invention, the meter casing may consist of a front part 1 and a rear part 2 which may be fastened together by any suitable means, as by screws 3 and 4. This case is preferably made so that it splits down the center, and the two parts have an interlocking flange connection, as indicated at 5 in Fig. 2.

In the front section 1 there is a window 6 through which a pointer 7 can be viewed, this pointer being adapted to move over a scale 8 which may be fastened to the upper portion of a light-sensitive cell 9, this cell being positioned behind a large window 10 in the rear casing section. Window 10 is covered by a glass plate 11, preferably carrying a series of lenticular elements 12 so that light passing through this window will fall upon the light-sensitive cell 9.

The pointer 7 will indicate the light conditions when the window 10 is pointed towards an object to be photographed, so that the light rays L may pass through the window 10 to the light-sensitive cell 9. The normal exposures can be read directly from the scale 8, and under the light conditions assumed for Fig. 1, the exposure for 16 frames per second with a film having a speed of 8 would require a diaphragm setting of f/5.6. However, if a film of different speed is to be used, the scale designated broadly as 13 may be used.

Figure 3:
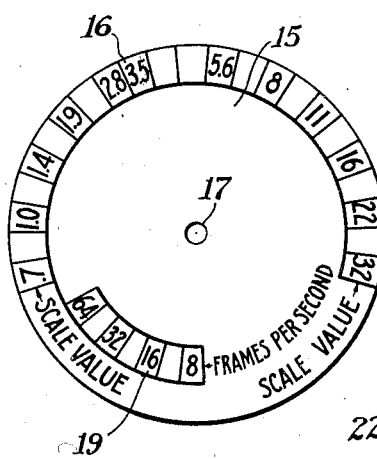
Fig. 3 is a front plan view of a fixed scale carrying element removed from the meter.
Figure 4:
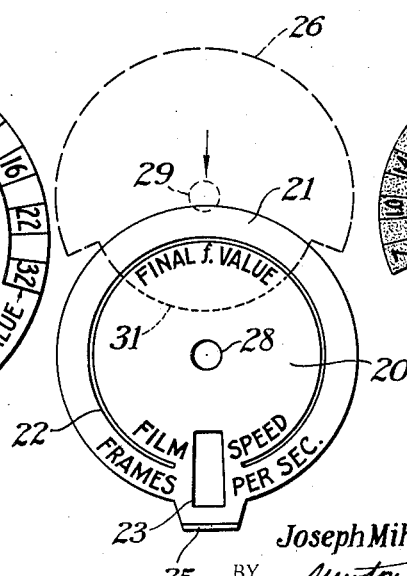
Fig. 4 is a similar view of a second disc-like member removed from the meter.
Figure 5:
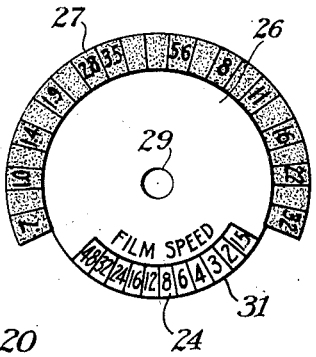
Fig. 5 is a similar view of a third disc-like scale carrying member.

This scale is preferably mounted in a recess 14 in the front section of the casing and consists of a first disc-like member 15, as indicated in Fig. 3, this disc-like member including a scale 16 around its periphery graduated into units which are identical to the units of scale 8. This disc is provided with an aperture 17 through which the screw 18 passes, and if desired the scale 15 may also be cemented in the recess 14.

In addition to the scale 16, the first disc-like member carries a second scale 19 graduated into units of frames per second. This is to take care of motion picture cameras which are capable of different speeds, usually half speed or 8 frames per second, normal speed or 16 frames per second, double speed or 32 frames per second, and high speed or 64 frames per second. Since 16 frames per second are almost universally used, the other graduations on this scale are seldom used.

The second member forming a part of scale 13 is a second disc-like member 20. This member does not carry scales, and the periphery 21 is almost severed from the rest of the disc-like member by means of a slot 22 which extends more than 300° and is concentric with the disc. The slot 22 stops on each side of a window 23 through which the scale 19 of the first disc-like member 15 can be read, and also through which still another scale 24 graduated into units of film speeds can also be read. Member 21 is preferably provided with a turned-up lug 25 for convenience in turning this member, although after once setting it for the film in use, this member is seldom operated.

A third disc-like member 26 is used, this member bearing, in addition to scale 24, a second scale 27 which is also graduated into units which are identical to the units of scale 16 and of scale 8. The second and third disc-like members 20 and 26 are provided with apertures 28 and 29 which are of such a diameter that they may turn freely on the shoulder 30 of the stud 18. In assembling the third disc to the second disc, the lower edge 31 may be inserted between the two parts of the disc-like member 21 which are formed by the arcuate slot 22. The disc-like member 26 may then be moved in the direction shown by the arrow until the opening 29 is in registration with the opening 28 after which these two members can be assembled over the first member by merely tightening the stud 18.

Figure 1:
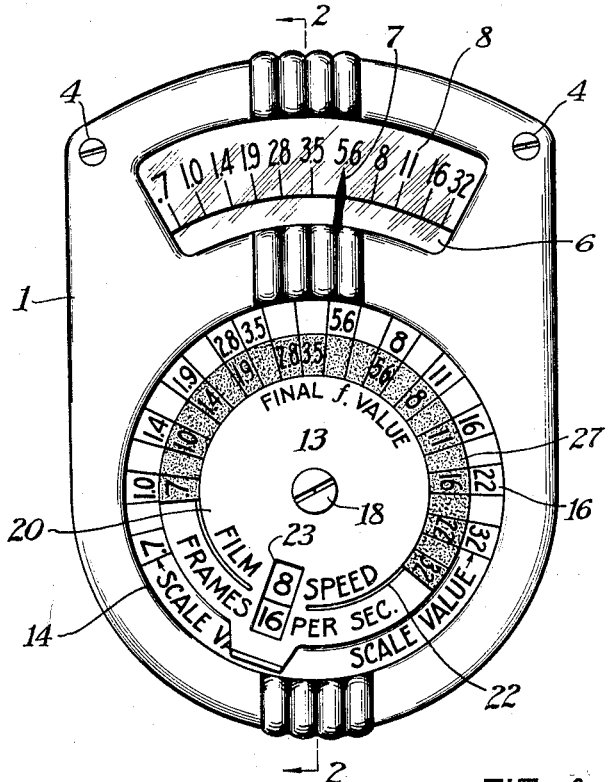
Fig. 1 is a front elevation of an exposure meter constructed in accordance with and embodying a preferred form of our invention.

With a scale made as above described the operation is extremely simple because it usually happens that the user of such a meter uses one type of film, and quite frequently uses only one film speed for quite a period of time. This makes it necessary to only use the scale 13 a minimum amount, usually it being only necessary to set the film speed and frames per second used so that they will appear through the window 23. Thus, with a film speed of 8 and 16 frames per second, scale 13 would be set as shown in Fig. 1, and could remain in this set position until either the speed of the camera or the speed of the film is altered.

The operation of this device would then be that the operator would point the window 10 toward the object being photographed to measure the light reflected therefrom. The pointer 7 would immediately move to a position over the scale 8 which would give the diaphragm opening for normal film. Should the film being used be other than normal, it would be only necessary for an operator to read from the scale 16 to the next adjacent scale 27 to obtain the proper exposure. If, for instance, the film speed is 8, which is an extremely slow speed film, and the pointer should point to 11 on the scale 8, the operator would adjust the diaphragm for $f.8$, this being the final F value indicated by the scale 13.

In order to make it easier for an operator to make the proper reading and to make the meter more nearly fool-proof, we prefer to provide the graduations on scale 16 and scale 8 in the same color ink, for instance, red, and to provide the graduations on the scale from which the final F value is read—scale 26—of a contrasting color, such as, for instance, black. Then, in the few cases where a normal speed film is not used, the operator would read the position of the pointer on one red scale, select the same number on a second red scale—16—and read the final diaphragm opening from a third black scale—27. These colors are, of course, used by way of illustration, but indicate clearly that by making these scales of contrasting colors the liability of error is considerably reduced. In order to indicate that the scale showing the final F value—27— is of contrasting color from the other two scales which are preferably of light color, we have shown this scale as being stippled.

It should be particularly pointed out that with this meter, for normal reading it is entirely unnecessary to read scales graduated into various different units, since we have provided the three primary scales with identical graduations, so that the liability of difficulty in reading the exposure from this light meter is reduced to a minimum. Moreover, for a normal exposure, it is not necessary to use the scale 13 at all since the scale 16 will give the correct reading.

We propose to provide meters with scales arranged so that the direct reading scale 8 will give the correct reading for the particular type of film which the customer ordinarily uses. For instance, if a customer uses chiefly "panchromatic" film, he may be provided with a meter in which the scale 8 is direct reading for this type of film. If the customer is primarily interested in a "special" color film, he will be given a meter in which scale 8 is graduated for direct reading of such film. In both cases the scale 13 is built up of disc-like members 20 and 26 graduated into units of the next two most popular types of film. Thus, each customer can directly read the required diaphragm opening for the film he is most interested in, and if he uses other film, he can readily interpret from the scale 13 the required diaphragm opening for such film. In the more or less unlikely event that, in addition to a different speed of film, he may use a different camera speed, this, too, can be readily cared for by placing the proper number of frames per second in the window 23.

What we claim is:

1. A scale for exposure meters comprising a base member bearing an arcuate scale, a second disc-like member pivotally attached to the base and including an arcuate slot severing a large part of the disc from the remainder, a window in the second member between the ends of the arcuate slot, and a third disc-like member co-axially mounted on the same pivot as the second member, the third disc-like member having a flange carrying a scale adapted to project through the arcuate slot, whereby the movement of the third member relative to the second is limited by said slot, and a scale on the third member visible in the window in the second member to indicate the relative setting of these members.

2. A scale for exposure meters comprising a base member bearing an arcuate scale, a second disc-like member pivotally attached to the base and including an arcuate slot severing a large part of the disc from the remainder, a window in the second member between the ends of the arcuate slot, and a third disc-like member co-axially mounted on the same pivot as the second member, the third disc-like member having a flange carrying a scale adapted to project through the arcuate slot, whereby the movement of the third member relative to the second is limited by said slot, a scale on the support and a scale on the third member visible in the window in the second member to indicate the relative setting of the second and third members relative to the support.

3. An adjustable exposure determining device including a base member, an arcuate scale thereon, a second disc-like member of smaller diameter than the arcuate scale and including an arcuate slot coaxially arranged with respect to said scale and extending through more than 300 degrees, a window on said second disc, a second arcuate scale on the base registering with the window, a third disc-like member including a flange bearing an arcuate scale of less diameter than the scale of the support, said scale bearing graduations similar to the base scale, said third scale flange projecting from the slot in the second member and being adapted for movement with said member, said third member also having a second scale visible only through the window.

JOSEPH MIHALYI.
NEWTON B. GREEN.